UNITED STATES PATENT OFFICE.

CARL DUISBERG, OF ELBERFELD, GERMANY.

RED COLORING-MATTER FOR DYEING BY THE ACTION OF TETRAZO DYES WITH BETA-NAPHTHYLAMINE SULPHO ACID.

SPECIFICATION forming part of Letters Patent No. 357,274, dated February 8, 1887.

Application filed December 14, 1885. Serial No. 185,644. (Specimens.)

*To all whom it may concern:*

Be it known that I, CARL DUISBERG, of Elberfeld, in the Empire of Germany, chemist, and assignor to the Farbenfabriken vorm. Friedr. Bayer & Co., have invented a new and useful Improvement in the Manufacture of Dye-Stuffs or Coloring-Matter, of which the following is a specification.

My invention relates to the production of a new blue-red color for dyeing cotton not mordanted in an alkaline bath, wool, and silk, in the common manner, by the action of tetrazodiphenoldimethylester upon the beta-naphthylaminmonosulpho acid, obtained by heating beta-naphtholmonosulpho acid with ammonia or sulphonizing beta-naphthylamine with ordinary or fuming sulphuric acid.

In carrying out my process practically I proceed as follows: Ten (10) kilos diamidodiphenoldimethylester, (dianisidin,) produced by the alkaline reduction of nitrophenolmethylester, (nitroanisol,) and transforming the formed hydrazo combination by means of concentrated acids, are dissolved in one hundred and fifty liters water and twenty (20) kilos of muriatic acid of the specific gravity of 1.161. When this solution is cooled by ice, six (6) kilos of sodium nitrite dissolved in water are gradually added. In this way a reddish-yellow solution of tetrazodiphenoldimethylester is formed. This solution is now added to twenty (20) kilos beta-naphthylaminmonosulpho acid suspended in a finely-comminuted condition in water, and so much acetate of soda or any other organic acid salt added until the solution has a slight smell of acetic acid, until all free mineral acid present has been replaced by acetic acid. The dark-brown precipitate formed is now allowed to stand for about twelve hours, then heated, transformed by treatment with soda or soda-lye into the soda salt, filtered, and dried. In this manner the soda salt of the amidoazo combination formed is obtained, which is of the following composition:

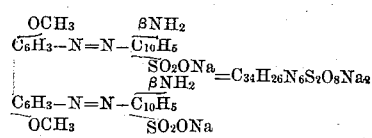

This represents a red amorphous powder, very soluble in hot water, but insoluble in alcohol. It dissolves in strong sulphuric acid, giving a blue color. The aqueous solution dyes dark-blue by the action of strong acids, whereas the action of the alkali does not alter it. Reducing agents destroy the color, forming diamidodiphenyl ether with other products. It dyes cotton not mordanted a splendid bluish-red in an alkaline bath containing phosphate of soda or carbonate of potash, and is fast to diluted acids, especially acetic acid.

What I claim as my invention, and desire to secure by Letters Patent, is—

1. The process of producing the new coloring-matter herein described, which consists in azotizing the diamidodiphenoldimethylester (ether) (dianisidin,) obtained by alkaline reduction of the nitrophenolmethylester (ether) (nitroanisol) and transformation of the formed hydrazodiphenoldimethylester (ether) (hydrazoanisol) by means of acids, with sodium nitrite, forming the tetrazodiphenoldimethylester, (ether,) and heating it in an organic acid solution with beta-naphthylaminmonosulpho acid.

2. The coloring-matter hereinbefore described and having the properties specified, and which is a red amorphous powder, very soluble in hot water, but insoluble in spirits, dissolving in strong sulphuric acid, giving a blue color, and of which the aqueous solution dyes dark-blue by the action of strong acids, but is not altered by the action of the alkalies, and which color is destroyed by the reducing agents, forming diamidodiphenylether, with other products.

CARL DUISBERG.

Witnesses:
ANTHONY GREF,
WILLIAM A. POLLOCK.